(12) United States Patent
Clendaniel et al.

(10) Patent No.: US 9,556,638 B2
(45) Date of Patent: Jan. 31, 2017

(54) PORTABLE HUNTING BLIND

(71) Applicants: Cynthia Theresa Clendaniel, Melbourne, FL (US); Herbert Everette Clendaniel, Jr., Hartly, DE (US); Gerald Eric Clendaniel, Melbourne, FL (US)

(72) Inventors: Cynthia Theresa Clendaniel, Melbourne, FL (US); Herbert Everette Clendaniel, Jr., Hartly, DE (US); Gerald Eric Clendaniel, Melbourne, FL (US)

( * ) Notice: Subject to any disclaimer, the term of this patent is extended or adjusted under 35 U.S.C. 154(b) by 0 days.

(21) Appl. No.: 15/051,145

(22) Filed: Feb. 23, 2016

(65) Prior Publication Data

US 2016/0244990 A1 Aug. 25, 2016

Related U.S. Application Data

(60) Provisional application No. 62/119,621, filed on Feb. 23, 2015.

(51) Int. Cl.
*E04H 15/00* (2006.01)
*E04H 15/44* (2006.01)
*A01M 31/02* (2006.01)

(52) U.S. Cl.
CPC .......... *E04H 15/001* (2013.01); *A01M 31/025* (2013.01); *E04H 15/44* (2013.01); *Y10S 135/901* (2013.01)

(58) Field of Classification Search
CPC .... E04H 15/001; E04H 15/44; A01M 31/025; Y10S 135/901; Y10S 135/909

USPC ................ 135/901, 902, 909, 121, 122, 157
See application file for complete search history.

(56) References Cited

U.S. PATENT DOCUMENTS

| | | | | |
|---|---|---|---|---|
| 1,778,815 A | * | 10/1930 | Scrivner | E04H 15/003 135/118 |
| 1,925,467 A | * | 9/1933 | Sinning | A47B 43/04 135/118 |
| 2,511,452 A | * | 6/1950 | Anderson | E04H 15/001 135/117 |
| 2,848,756 A | * | 8/1958 | McCann | E04H 15/003 135/117 |

(Continued)

FOREIGN PATENT DOCUMENTS

FR 2684404 A1 * 6/1993 ............. E04H 15/18

*Primary Examiner* — Robert Canfield
(74) *Attorney, Agent, or Firm* — Dunlap Bennett & Ludwig PLLC

(57) ABSTRACT

A portable hunting blind having a fabric panel supported and retained by a blind frame, which together bound a concealed space is provided. The blind frame includes two spaced apart horizontal members and a supporting framework for holding the two spaced apart horizontal members parallel to each other and above a supporting surface by a predetermined height, wherein all components of the blind frame are assembled by slidably mating. The fabric panel is dimensioned and adapted to be supported by an exterior of the two spaced apart horizontal members and the supporting framework so as to bound the concealed space. The fabric panel provides a plurality of strap fasteners for removably securing to the components of the blind frame by simply wrapping around them, thereby making the portable hunting blind light weight and to easily assemble without additional parts or tools.

3 Claims, 4 Drawing Sheets

(56) References Cited

U.S. PATENT DOCUMENTS

| | | | | | |
|---|---|---|---|---|---|
| 3,323,530 | A | * | 6/1967 | Smith | A01M 31/00 135/115 |
| 3,509,891 | A | * | 5/1970 | De Bolt | A01K 97/01 135/148 |
| 5,010,909 | A | * | 4/1991 | Cleveland | E04H 15/001 135/119 |
| 5,377,711 | A | * | 1/1995 | Mueller | E04H 15/001 135/115 |
| 7,240,683 | B2 | * | 7/2007 | Zutich | A45B 23/00 135/121 |
| 7,975,712 | B2 | * | 7/2011 | Beacco | A01M 31/025 135/139 |
| 8,555,908 | B2 | * | 10/2013 | Gross | E04H 15/34 135/114 |
| 9,033,021 | B2 | * | 5/2015 | Hand | A01M 31/00 135/901 |
| 2010/0018560 | A1 | * | 1/2010 | Milano, Jr. | E06B 3/38 135/121 |
| 2010/0229906 | A1 | * | 9/2010 | Putman | A01M 31/025 135/96 |
| 2013/0219768 | A1 | * | 8/2013 | Hand | A01M 31/00 43/1 |

* cited by examiner

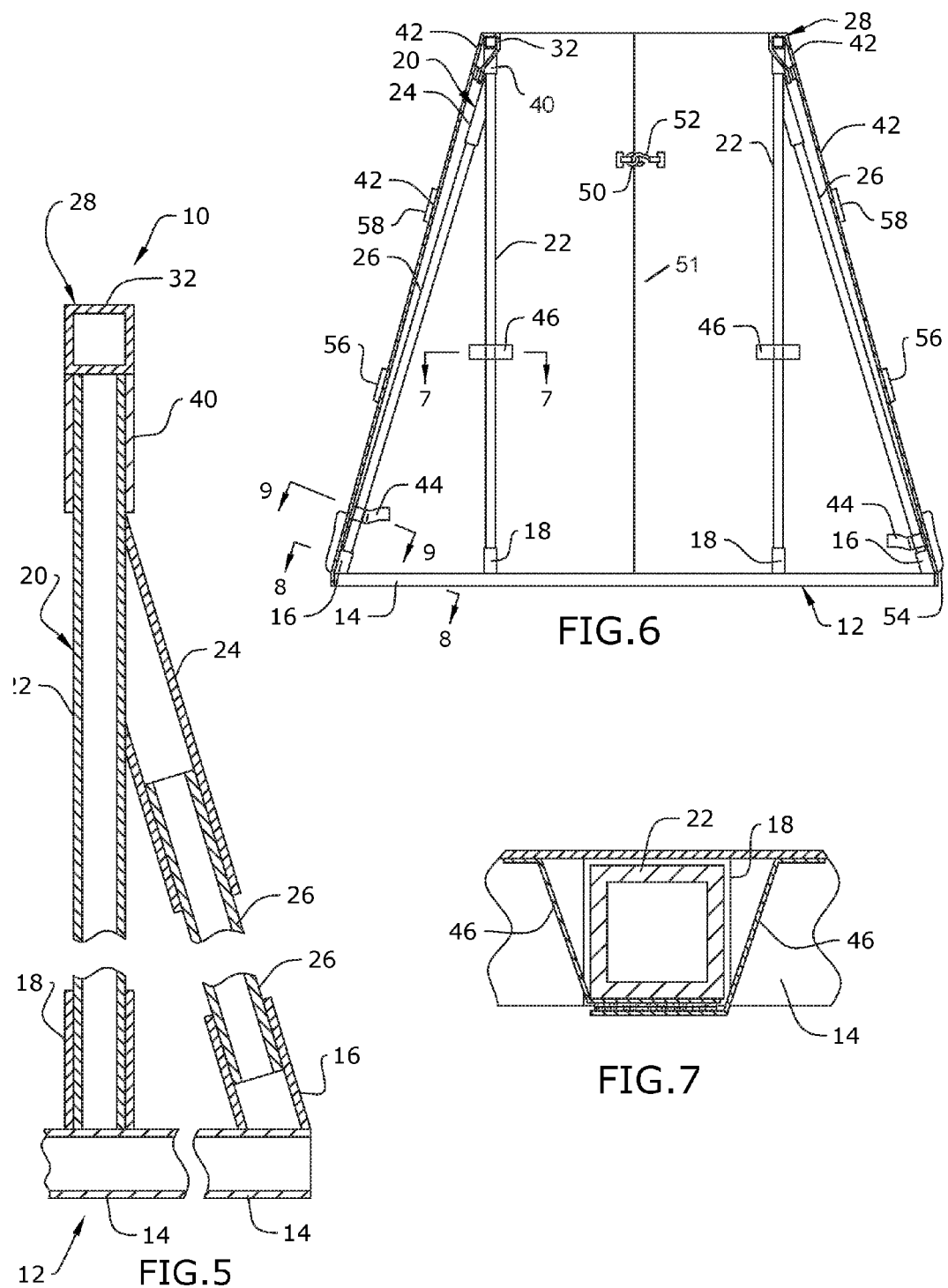

US 9,556,638 B2

PORTABLE HUNTING BLIND

CROSS-REFERENCE TO RELATED APPLICATION

This application claims the benefit of priority of U.S. provisional application No. 62/119,621, filed 23 Feb. 2015, the contents of which are herein incorporated by reference.

BACKGROUND OF THE INVENTION

The present invention relates to temporary shelters and, more particularly, to a portable hunting blind requiring no additional equipment, tools, or people to easily assemble.

When hunting on the ground or in a boat, hunters use concealment to gain an advantage on their game, which is the impetus for the portable hunting blind. Current portable hunting blinds, however, require additional parts and equipment for their assembly, such as pins, clips, hammer, and screw driver, or even require an additional person to assemble This in turn requires hunters to pack and carry such items with them during the hunt, making the use of these current hunting blinds burdensome in both carrying and assemblage.

As can be seen, there is a need for a portable hunting blind requiring no additional equipment, tools, or people to easily assemble, making it light weight and so facilitating individual hunting from a concealed location, whether on the ground or in a boat.

SUMMARY OF THE INVENTION

In one aspect of the present invention, a portable hunting blind includes two spaced apart horizontal members; a supporting framework for holding the two spaced apart horizontal members parallel to each other and above a supporting surface by a predetermined height; and a fabric panel dimensioned and adapted to be supported by an exterior of the two spaced apart horizontal members and the supporting framework so as to bound a concealed space.

These and other features, aspects and advantages of the present invention will become better understood with reference to the following drawings, description and claims.

BRIEF DESCRIPTION OF THE DRAWINGS

FIG. 5 is a section view of an exemplary embodiment of the present invention, taken along line 5-5 of FIG. 2;

FIG. 6 is a section view of an exemplary embodiment of the present invention, taken along line 6-6 of FIG. 1;

FIG. 7 is a detail section view of an exemplary embodiment of the present invention, taken along line 7-7 of FIG. 6;

ITEMIZED PARTS LIST

Figure 1:
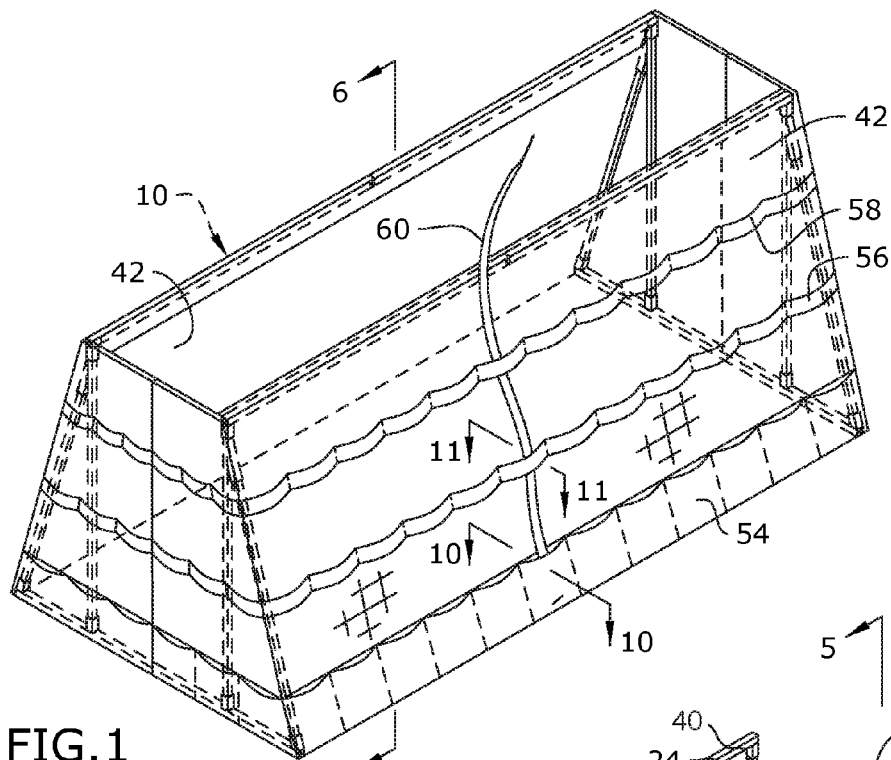
FIG. 1 is a perspective view of an exemplary embodiment of the present invention, shown in use.
Figure 2:
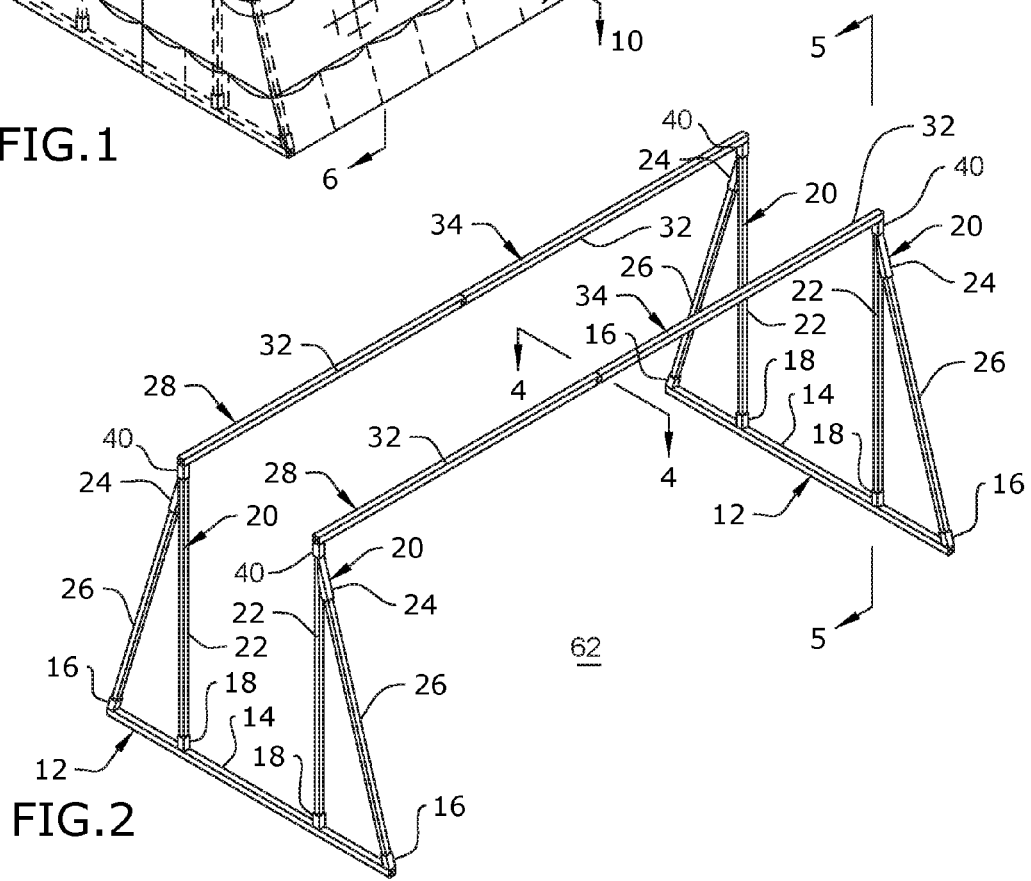
FIG. 2 is a perspective view of an exemplary embodiment of a framework of the present invention; shown without fabric component.

10: portable hunting blind frame.
12: bottom bar assemblies.
14: bottom bar assemblies main bars.
16: bottom bar assemblies corner brace channel.
18: bottom bar assemblies corner brace channel vertical inner brace channels.
20: are the upper portions of the vertical members 22.
22: vertical assemblies main bars.
24: vertical assembly corner brace channel.
26: are the diagonal members.
28: (female) upper bar assemblies.
30: (female) upper bar assemblies hole for side bar.
32: upper bar assemblies main bar.
34: (male) upper bar assemblies.
36: are the male protrusions.
38: upper assemblies (male) protrusions side pins.
40: upper bar assemblies brace channel.
42: is the fabric panel.
44: fabric panel inner bottom corner Velcro™ straps.
46: fabric panel middle Velcro™ straps.
48: fabric panel upper Velcro™ straps.
50: fabric panel eye clasp.
52: fabric panel J clasp.
54: fabric panel exterior lower pockets.
56: fabric panel exterior middle elastic bands.
58: fabric panel exterior upper elastic bands.
60: is the exemplary foliage.
62: is the supporting surface.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a portable hunting blind having a fabric panel supported and retained by a blind frame, which together bound a concealed space. The blind frame includes two spaced apart horizontal members and a supporting framework for holding the two spaced apart horizontal members parallel to each other and above a supporting surface by a predetermined height, wherein all components of the blind frame are assembled by slidably mating. The fabric panel is dimensioned and adapted to be supported by an exterior of the two spaced apart horizontal members and the supporting framework so as to bound the concealed space. The fabric panel provides a plurality of strap fasteners for removably securing to the components of the blind frame by simply wrapping around them, thereby making the portable hunting blind light weight and to easily assemble without additional parts or tools.

Referring to FIGS. 1 through 11, the present invention may include a fabric panel 42 supported and retained by a blind frame 10, which together bound a concealed space. The material of the blind frame 10 may be made of material that can be repeatedly bent without fracturing, as polyethylene, polypropylene, vinyl, nylon, rubber, leather, various impregnated or laminated fibrous materials, various plasticized materials and the like.

The blind frame 10 may include spaced apart horizontal members 32 held generally parallel to each other and a supporting surface 62 by the ends of vertical members 22 of a supporting framework 12. The supporting framework 12 may include cross members 14 that extend along the supporting surface 62, transverse to the horizontal members 32, and connect to the opposing ends of the vertical members 22. The supporting framework 12 may include diagonal members 26 that connect an upper portion 20 of the vertical members 22 to the cross members 14. Cross members 14 further include vertical and diagonal mounting channels 18 and 16 dimensioned and adapted to slidably secure the connecting vertical and diagonal members 22 and 26, wherein the diagonal channels 16 are disposed at the distal ends of the cross member 14 and the vertical channels 18 are disposed there between, generally symmetrically. Similarly, the upper portions 20 of the vertical members 22 may provide diagonal mounting channels 24 for slidably securing an upper end of the diagonal members 26.

Figure 3:
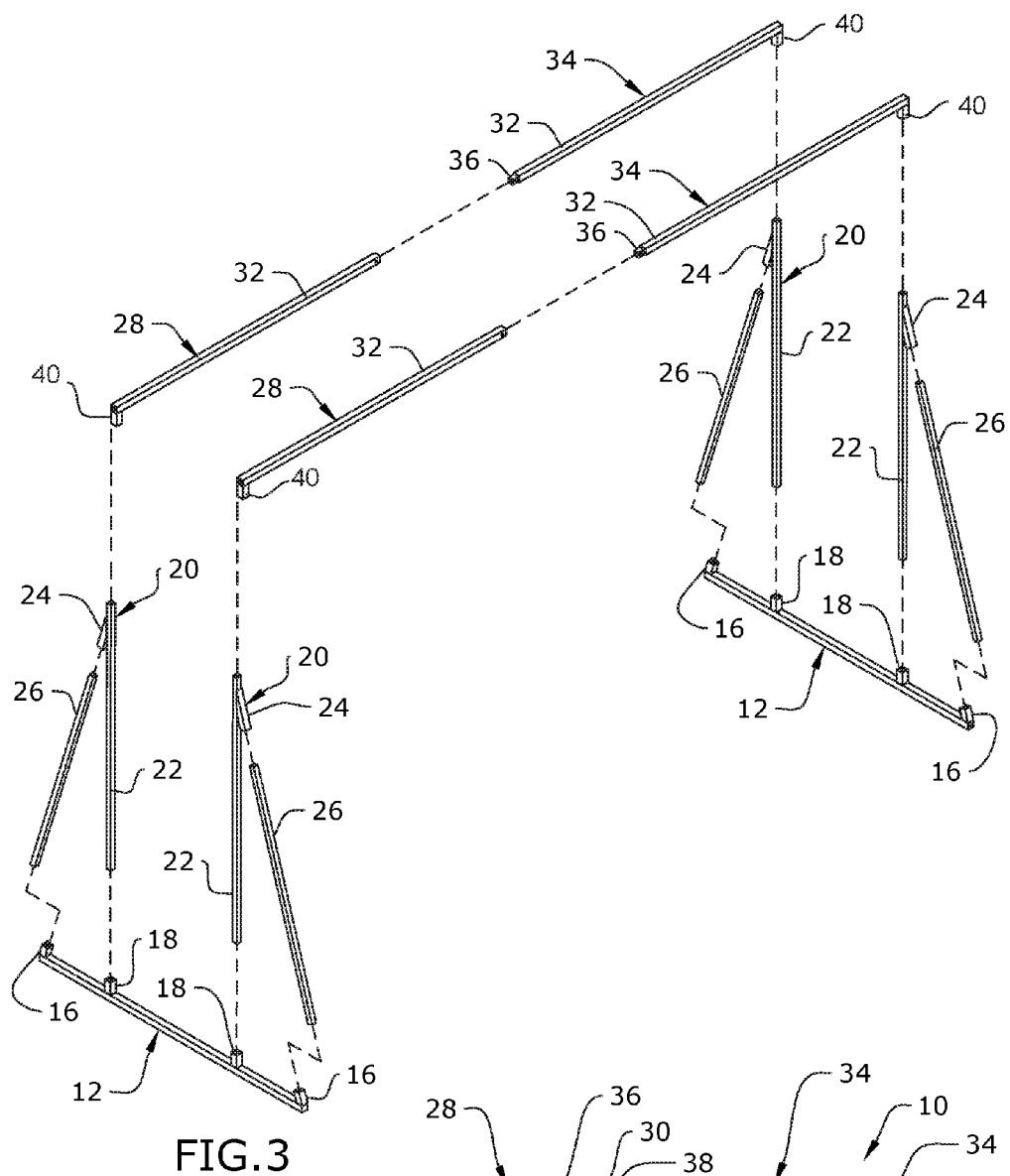
FIG. 3 is an exploded view of an exemplary embodiment of the framework of the present invention.

The diagonal members 26, akin to outriggers, resist lateral overturning of the vertical and thus horizontal members 22 and 32 by extending diagonally from the upper portion 20 of the vertical members 22 along a plane orthogonal to that of the horizontal members 32 and the supporting surface 62, as illustrated in FIG. 3.

Figure 4:
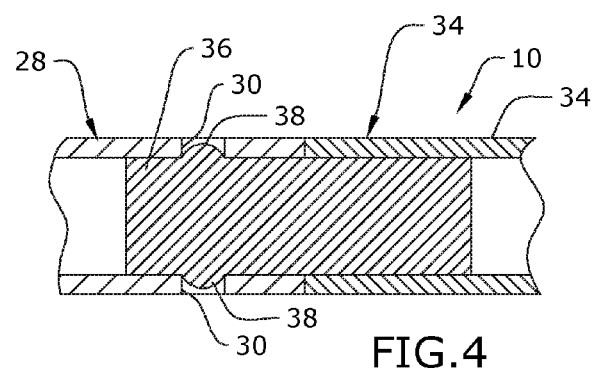
FIG. 4 is a detail section view of an exemplary embodiment of the present invention, taken along line 4-4 of FIG. 2.
Figure 8:
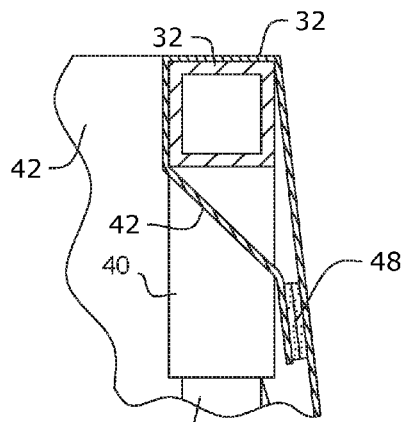
FIG. 8 is a detail section view of an exemplary embodiment of the present invention, taken along line 8-8 of FIG. 6.
Figure 9:
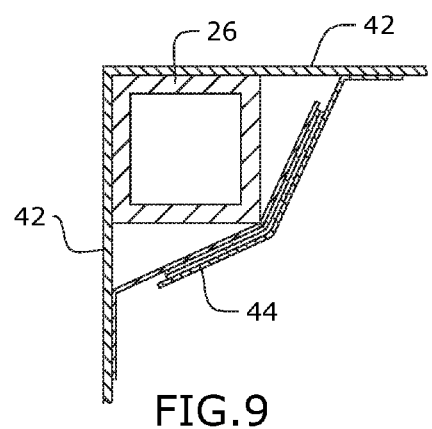
FIG. 9 is a detail section view of an exemplary embodiment of the present invention, taken along line 9-9 of FIG. 6.

Referring to FIG. 3, each horizontal member 32 may include first and second members 28 and 34. The first and second members 28, 34 may have slidably mating parts 30, 36 and 38 at one end and terminate in upper vertical mounting channels 40 on opposing ends. The first and second members 28, 34 may each extend from a coupling end to a distal end along a longitudinal axis in the direction of their lengths so that the slidably mating parts 30, 36 and 38 on each coupling end enables removably connecting the first and second members 28, 34 so they continuously extend along their longitudinal axis. The slidably mating parts may include snap-in locator pins 38 and holes 30 and male protrusions 36, as illustrated in FIG. 4. The upper vertical mounting channels 40 may be dimensioned and adapted to slidably secure the upper portions 20 of the vertical members 22. All mounting channels 40, 24, 18, 16 are adapted to prevent torsion or rotation of the members they slidably secure.

The fabric panel 42 may be made of sufficiently durable, light weight, waterproof (or water/climate resistant) opaque fabric, such as denier or the like. The fabric panel 42 may be dimensioned and adapted to snugly engage the exterior of an erected blind frame 10. The fabric panel 42 may provide a plurality of pairs of strap fasteners 44, 46 or 48 disposed along the fabric panel 42 so that each pair of strap fasteners 44, 46 or 48 may wrap around a member 22, 26, 32 so as to secure an associated portion of the fabric panel 42 thereto, as illustrated in FIG. 7.

It should be understood that the each pair of strap fasteners 44, 46 or 48 may include any fastener known in the art for fastening or removably securing one object to another including, for example, standard push-button snaps, Velcro-type fasteners, adhesive substances, combinations thereof, and the like. It should also be understood that the plurality of pairs of strap fasteners 44, 46 or 48 may be configured in any array and/or number, so long as the fasteners function in accordance with the present invention as described herein.

The fabric panel 42 may have an egress slot 51 by which a user may enter and exit the concealed space. The egress slot 51 may form two opposing portions of the fabric panel 42 that may be secured by cooperating first and second clasps 50, 52.

Figure 10:
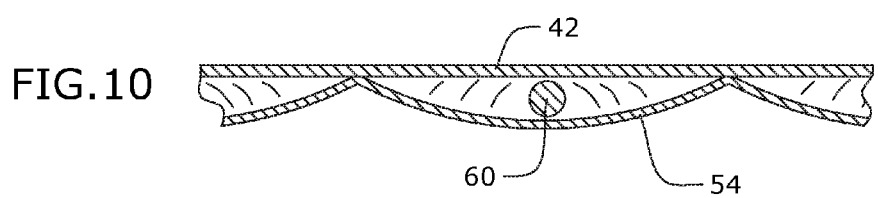
FIG. 10 is a detail section view of an exemplary embodiment of the present invention, taken along line 10-10 of FIG. 1.
Figure 11:
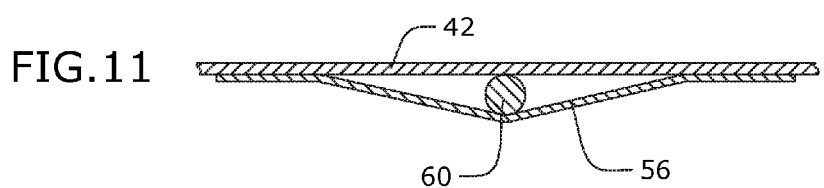
FIG. 11 is a detail section view of an exemplary embodiment of the present invention, taken along line 11-11 of FIG. 1.

The fabric panel 42 may have a camouflage pattern printed thereon. The fabric panel 42 may provide a plurality of lower, middle and upper elastic bands 54, 56, 58, respectively stitched into it so as to hold natural/synthetic grass, sticks, branches, or gillie cloth for addition camouflage. Specifically, foliage 60 may be slidably received through at least one pocket formed by at least one elastic bands 54, 56, 58, as illustrated in FIGS. 1, 10 and 11.

It should be understood, of course, that the foregoing relates to exemplary embodiments of the invention and that modifications may be made without departing from the spirit and scope of the invention as set forth in the following claims.

What is claimed is:

1. A portable hunting blind comprising:
two spaced apart horizontal members;
a supporting framework for holding the two spaced apart horizontal members parallel to each other and above a supporting surface by a predetermined height;
a fabric panel dimensioned and adapted to be supported by an exterior of the two spaced apart horizontal members and the supporting framework so as to bound a concealed space,
wherein each of the two spaced apart horizontal members further comprise:
a first and second members, each extending from a coupling end to a distal end; and
a slidably mating part on each coupling end for removably connecting the first and second members,
wherein the first and second members further comprise an upper vertical mounting channel at or near each distal end,
wherein the supporting framework further comprises a plurality of vertical members extending from an upper portion to a supporting end, and wherein each upper portion is dimensioned to slidably mate with each upper vertical mounting channel,
wherein the supporting framework further comprises a plurality of diagonal members, each attached to the upper portion of each vertical member so as to extend to a supporting end, and
wherein the supporting framework further comprises two cross members disposed along the supporting surface, wherein each cross member provides mounting channels for at least two of the supporting ends of each of the plurality of vertical and diagonal members,
whereby the supporting framework and the two horizontal members are adapted to be assembled by slidably mating.

2. The portable hunting blind of claim 1, wherein the fabric panel further includes a plurality of strap fasteners disposed along the fabric panel so as securely engage the plurality of vertical and diagonal members,
whereby the fabric panel is secured by only wrapping the plurality of strap fasteners about said plurality of vertical and diagonal members.

3. The portable hunting blind of claim 1, wherein the fabric panel further includes a plurality of elastic bands adapted to slidably receive foliage.

* * * * *